Figures 1, 2, 3:
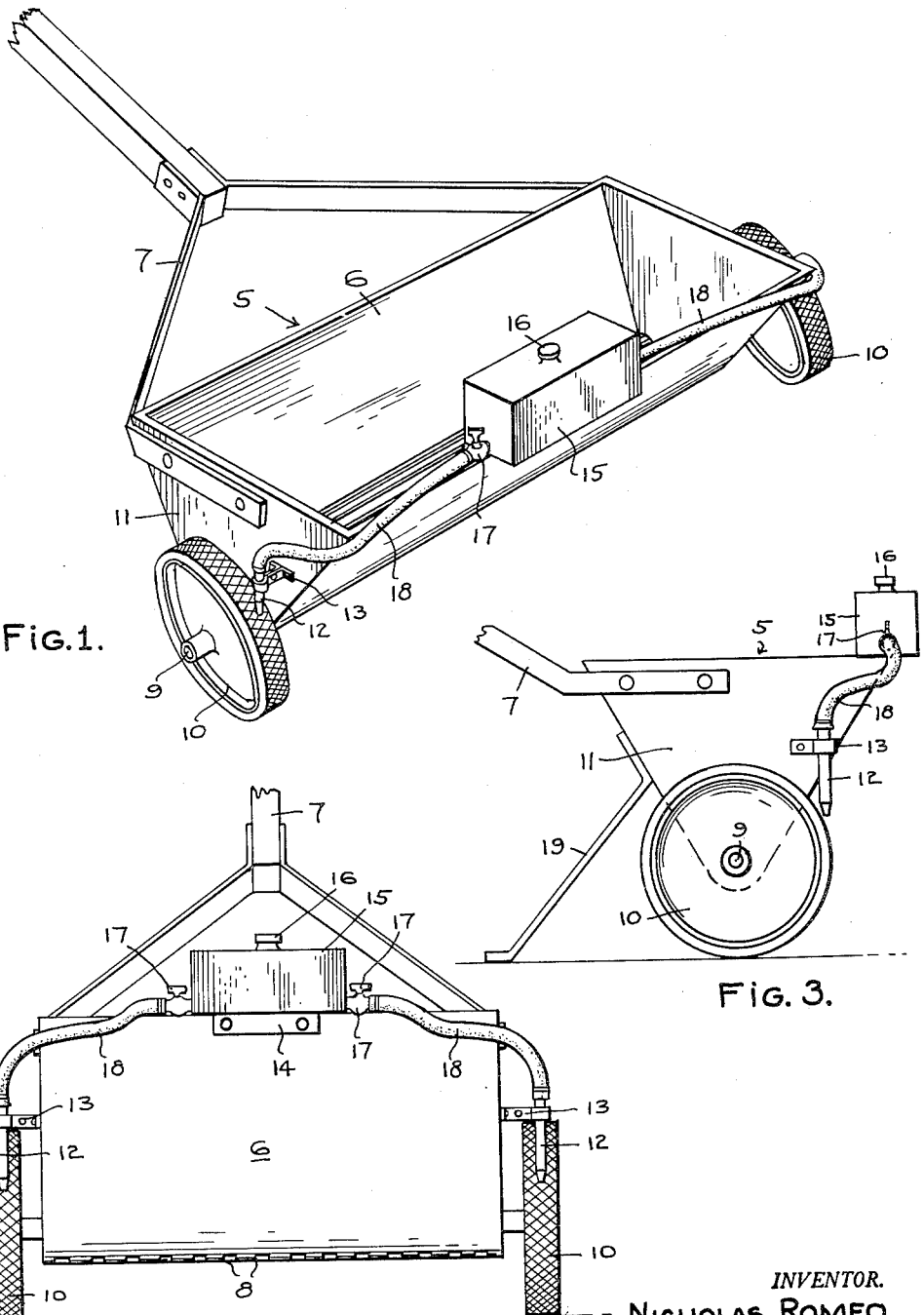

Feb. 6, 1962 N. ROMEO 3,019,470
COMBINATION FERTILIZER SPREADER AND LAWN MARKER
Filed April 21, 1959

INVENTOR.
NICHOLAS ROMEO,
BY
James H. Cyle
ATTORNEY

3,019,470
COMBINATION FERTILIZER SPREADER AND LAWN MARKER
Nicholas Romeo, 6950 NW. 19th Court, West Hollywood, Fla.
Filed Apr. 21, 1959, Ser. No. 807,844
3 Claims. (Cl. 15—503)

This invention relates to a marker in combination with the conventional wheeled lawn fertilizer spreaders and has particular reference to means whereby the user of the spreader can determine the areas or strips of lawn that have previously been traversed by the spreader.

The invention contemplates a marker for the conventional two-wheel fertilizer spreaders that comprises a fluid supply tank that is rigidly fixed upon an upper forward edge of the bin portion of the spreader and with laterally extending flexible tubes that extend from either end of the tank for discharging a colored fluid directly upon the treads of the tires carried by the wheels and whereby a definite line of demarkation may be rolled upon the grass as the spreader is moved back and forth across the lawn thus causing the wheels to function as an applicator for the markings.

The invention further contemplates a fluid supply tank that is clipped or fixedly engaged with the fertilizer spreader substantially intermediate its length and with cut-off valves at each end of the tank that control the flow of a colored fluid to discharge nozzles that are positioned with their discharge ends in overlying relation to the wheels.

Novel features of construction and operation of the device will be more clearly apparent during the course of the following description, reference being had to the accompanying drawing wherein has been illustrated a preferred form of the device and wherein like characters of reference are employed to denote like parts throughout the several figures.

In the drawings:

FIGURE 1 is a perspective view of a fertilizer spreader showing the invention applied thereto, FIGURE 2 is a front elevation of the fertilizer spreader having the invention applied thereto and, FIGURE 3 is an end view of the device.

Referring specifically to the drawings, the numeral 5 designates a conventional fertilizer spreader as a whole, having a generally V-shape bin 6, controllable in its forward movement by a handle structure 7. In fertilizer spreaders of this type, there is usually an agitator located in the apex of the bin to agitate and discharge the fertilizer through apertures 8. The agitator is driven by a shaft 9, having ground wheels 10 at its outer ends. The ground wheels are usually provided with rubber treads, as is customary.

Fixed upon each end portion 11 of the bin, are discharge nozzles 12, fixed to the ends 11, by brackets 13. As clearly shown in FIGURE 3, the discharge end of the nozzles are positioned so as to discharge fluid upon the treads of the wheels 10, as the wheels move forwardly in the rolling action of the fertilizer spreader. Fixed upon the forward edge of the bin 6, as by bracket 14, is a fluid containing tank 15, having a filler cap 16. The tank 15 is provided at its opposite ends, adjacent its bottom, with cut-off valves 17. Extending between the cut-off valves 17 and the nozzles 12, are flexible conduits 18. The conduits 18 may be formed of rubber, plastic or any other suitable material calculated to resist deterioration by the fluid from the tank 15. A leg rest 19 is usually carried upon the rear wall of the bin 6 as a means for holding the spreader in a level position while filling with fertilizer or, while replenishing the fluid within the tank 15. It is contemplated that a colored fluid shall be used that will not injure the grass and that will be clearly discernible by the user of the device. One desirable form of marker fluid that has been found advantageous, is arsenate of lead which, is of a greenish or bluish color and that will leave a definite mark upon the surface of the lawn as the spreader is rolled about. The arsenate of lead of course is an insecticide and will readily wash into the ground without damage to the grass.

In the use of the device, the operator obviously first fills the bin 6 with fertilizer. He then makes a solution of arsenate of lead or other colored fluids and pours it into the tank 15. When the spreader is ready for use, the operator opens the valves 17, causing a predetermined quantity of the fluid to pass through the conduits 18 to the discharge nozzles 12 now, as the spreader is rolled back and forth, the constant dropping of the fluid upon the treads of the wheels, will leave a very definite mark upon the lawn, indicating to the operator the area that has been traversed by the spreader. The spreader is then rolled upon a return trip, using the line of demarkation as a guide for the next strip of lawn to be fertilized. This action is continued during the use of the spreading. When the spreader is in an inoperative position, the valves 17 are closed to prevent a wasting of the coloring fluid.

It will be apparent from the foregoing that a very desirable means has been provided to indicate to the operator of a fertilizer spreader those areas of the lawn that have been covered by fertilizer and to avoid retracing the path of the spreader over those areas where there is a question in the mind of the operator as to whether it has been covered. The marking upon the lawn will indicate definitely each path of travel of the spreader, resulting in a more even distribution of the fertilizer and to prevent overlapping. When using arsenate of lead, the marking upon the lawn will be washed into the root system, also being beneficial to the lawn from the standpoint of insects. The device is simple in construction, is strong, durable, easily attached to any of the conventional wheel spreaders now in use and is most effective from the standpoint of preventing an overlapping of the area being covered and will result in a considerable saving in the cost of fertilizer. While the tank 15 has been shown as being conveniently mounted upon the forward edge of the bin, it will be apparent that the tank may be supported from the handle of the device so long as the tank is at an elevation whereby the fluid will flow to the nozzles by gravity.

It is to be understood that the invention is not limited to the precise construction shown, but that changes are contemplated as readily fall within the spirit of the invention as shall be determined by the scope of the subjoined claims.

Having described my invention, what I claim as new and desire to secure by Letters Patent is:

1. A lawn marker in combination with a lawn fertilizer spreader of the type that has an open bin defined by angled side walls and vertical flat end walls, the bin having a pair of supporting ground wheels, a tank supported upon a forward upper marginal edge of the bin for the reception of a colored fluid, discharge nozzles fixed upon the flat end portions of the bin and with the nozzles having their discharge ends in overlying relation to treads of the wheels, fluid conducting conduits leading from the tank and that are connected to the nozzles whereby to conduct the colored fluid from the tank to be deposited upon the treads of the wheels for rolling application upon the lawn to indicate the line of traverse of the spreader.

2. The structure according to claim 1, wherein the tank is fixedly disposed upon the marginal edge portion of the bin intermediate its length, the fluid conduits extending in opposite directions from the lower portion of the tank and cut-off valves therein for controlling the flow of fluid to the nozzles.

3. The structure according to claim 1, wherein the nozzles are rigidly connected upon the ends of the bin by brackets, the fluid conduits being flexible, and a bracket device carried by the tank connected with the bin of the spreader.

References Cited in the file of this patent

UNITED STATES PATENTS

| | | |
|---|---|---|
| 929,597 | Johnson | July 27, 1909 |
| 1,312,351 | Peck | Aug. 5, 1919 |
| 1,591,216 | Langerwall | July 6, 1926 |
| 1,948,861 | Lindgren | Feb. 27, 1934 |
| 2,199,421 | Stevens | May 7, 1940 |
| 2,322,171 | Spatz | June 15, 1943 |
| 2,661,956 | Voss | Dec. 8, 1953 |